United States Patent [19]
Kreitzer

[11] Patent Number: 6,097,551
[45] Date of Patent: Aug. 1, 2000

[54] LENSES FOR ELECTRONIC IMAGING SYSTEMS

[75] Inventor: Melvyn H. Kreitzer, Cincinnati, Ohio

[73] Assignee: U.S. Precision Lens Inc., Cincinnati, Ohio

[21] Appl. No.: 09/308,798

[22] PCT Filed: Nov. 12, 1997

[86] PCT No.: PCT/US97/20144

§ 371 Date: May 25, 1999

§ 102(e) Date: May 25, 1999

[87] PCT Pub. No.: WO98/23988

PCT Pub. Date: Jun. 4, 1998

Related U.S. Application Data

[60] Provisional application No. 60/033,348, Nov. 29, 1996.
[51] Int. Cl.[7] .............................. G02B 9/04; G02B 13/18
[52] U.S. Cl. ............................................. 359/793; 359/717
[58] Field of Search ..................................... 359/793, 795, 359/709, 717, 648, 649, 651; 356/300, 301

[56] References Cited

U.S. PATENT DOCUMENTS 5,677,798 10/1997 Hirano et al. ............................ 359/717

*Primary Examiner*—Georgia Epps
*Assistant Examiner*—David N. Spector
*Attorney, Agent, or Firm*—Maurice M. Klee

[57] ABSTRACT

A lens system for an electronic system has two lenses. The first lens (S1/S2) has a negative power, and the second lens (S4/S5 or S5/S6) has a positive power and is spaced from the first lens (S1/S2) by a distance of at least a quarter of the focal length of the lens system. In one embodiment (FIG. 3), the second lens (S4/S5) is a refractive-diffractive hybrid lens; in which case both the first and the second lenses (S1/S2 and S4/S5) can be composed of acrylic, and can have only spherical and conic surfaces. In other embodiments (FIG. 1, 2, 4), the first lens (S1/S2) has a higher dispersion than the than the second lens (S4/S5 or S5/S6); for example, the first lens (S1/S2) is composed of styrene, and the second lens (S4/S5 or S5/S6) is composed of acrylic. In this case, the first lens (S1/S2) can have a spherical surface and a general aspherical surface, and the second lens (S5/S6) can have conic surfaces (FIG. 1, 2); or both of the first and second lenses (S1/S2 and S4/S5) can have a spherical surface, and a conic surface (FIG. 4).

33 Claims, 4 Drawing Sheets

LENSES FOR ELECTRONIC IMAGING SYSTEMS

CROSS REFERENCE TO RELATED APPLICATION

This application is the U.S. national phase of International Application No. PCT/US97/20144, filed Nov. 12, 1997, and claims the benefit under 35 USC §119(e) of the U.S. Provisional Application No. 60/033,348, filed Nov. 29, 1996, the contents of each of which in their entireties are hereby incorporated by reference.

FIELD OF THE INVENTION

This invention relates to lenses for use with electronic imaging systems, e.g., systems employing charged coupled devices (CCDs) or similar light sensitive electronic components. Such systems are well known in the art and descriptions thereof can be found in various references, including Rose et al., "Physical Limits to the Performance of Imaging Systems," Physics Today, September 1989, pages 24–32 and the references cited therein; and Sequin et al., "Charge Transfer Devices," Advances in Electronics and Electron Physics, suppl. 8, L. Marton editor, Academic Press, New York, 1975, the relevant portions of all of which are incorporated herein by reference.

BACKGROUND OF THE INVENTION

Electronic imaging systems require lens systems which are capable of producing high quality images which have a small size, i.e., they require lens systems having short focal lengths. For example, CCDs having a diagonal of approximately 5.5 mm (known as ⅓ inch CCDs) are widely available. Within this small size, a typical CCD will have over 200,000 pixels, thus giving the device a resolution on the order of 40 cycles per millimeter at the surface of the CCD.

Short focal length lens systems typically comprise small lens elements. Such elements, if they are too small, can be difficult to handle and assemble into a finished unit. Cost is always a dominant factor for lenses for electronic imaging systems, especially where the system is to be part of a mass marketed product. Because CCDs have a high level of resolution, lenses used with such devices must be of high optical quality. This requirement exacerbates the cost problem. In particular, the requirement puts a high premium on achieving a high level of optical performance with a minimum of lens elements.

SUMMARY OF THE INVENTION

In view of above considerations, it is an object of the present invention to provide lens systems for electronic imaging systems which: (1) use only two lens elements to minimize costs; (2) use a minimum of general aspherical surfaces, e.g., only one general aspherical surface and in some cases, no general aspherical surfaces, again to minimize costs, in this case by simplifying the manufacturing process; (3) use lens elements having relatively large diameters to facilitate handling and assembly; and (4) have a level of optical performance compatible with that of CCDs and similar electronic imaging devices.

To achieve this and other objects, the invention provides a two element lens system wherein a first element, located on the object side of the lens system, has a negative optical power and is relatively thick, and a second lens element, located on the image side of the lens system, has a positive power and is relatively widely spaced from the first lens element and/or is relatively thick. Preferably, both lens elements have a large diameter relative to the lens system's entrance pupil.

In certain embodiments, the system includes one general aspherical surface on the first lens element and two conic surfaces on the second lens element. In other embodiments, no general aspherical surfaces are used. In connection with these embodiments, one conic surface can be employed on the first lens element and two conic surfaces can be employed on the second lens element, which is preferably a refractive-diffractive hybrid element. Alternatively, a spherical surface and a conic surface can be used on both the first and second lens elements. In some embodiments, in order to achieve color correction, the first lens element is composed of styrene and the second lens element is composed of acrylic. The first and second lens elements can both be composed of acrylic when a refractive-diffractive hybrid element is used for the second lens element.

The lens systems of the invention have focal lengths and optical performances suitable for use with conventional CCDs. For example, the lens systems can readily achieve a focal length of less than 5.0 mm, an f-number of 2.8 or faster, and a MTF at the CCD of 40 cycles/millimeter, thus making them suitable for use with ⅓ inch CCDs.

Figure 1:
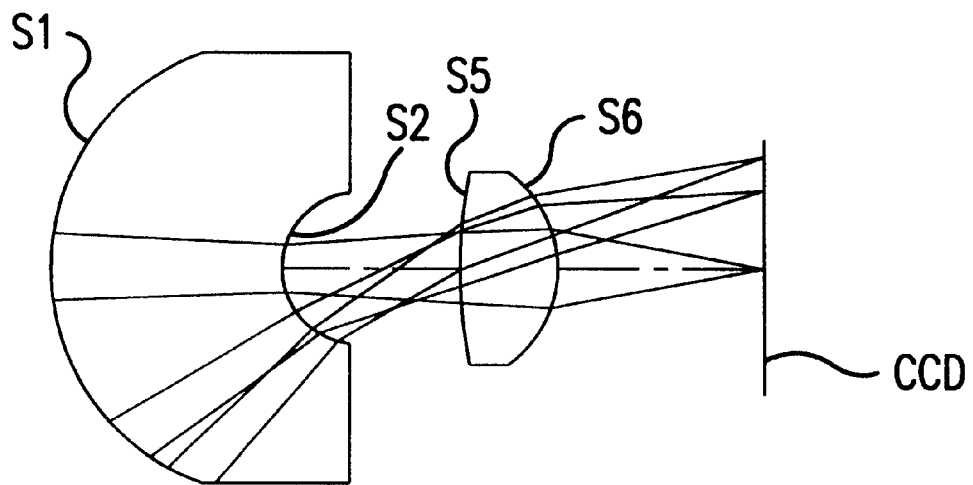
FIGS. 1–4 are schematic side views of lens systems constructed in accordance with the invention.

These drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

As discussed above, the lens systems of the present invention consist of two lens elements.

The first lens element has a negative optical power, i.e., $f_1 < 0$, and preferably has the following properties:

$$|f_1|/f_0 > 1.0;$$

$$t_1/f_0 > 0.5; \text{ and}$$

$$D_1/D_{EP} > 2.5;$$

where $f_0$ is the focal length of the lens system, $f_1$ is the focal length of the first lens element, $t_1$ is the thickness of the first lens element, $D_1$ is the diameter of the first lens element, and $D_{EP}$ is the diameter of the entrance pupil of the lens system. The use of a thick front element provides correction for the field curvature of the system.

In certain embodiments, the lens systems of the invention satisfy the following relationships:

$$|f_1|/f_0 > 1.5; \text{ and}$$

$$t_1/f_0 > 0.7.$$

In connection with these embodiments, the $t_1/f_0$ ratio is most preferably greater than 1.0.

As used herein and in the claims, the diameter of a lens element is the element's largest clear aperture and the diameter of the entrance pupil of a lens system is the system's equivalent singlet focal length divided by the system's infinity f-number. Based on these definitions, the lens systems of Examples 1–4 set forth below have $D_1$ values of 9.5, 9.6, 11.9, and 5.6 mm, and $D_{EP}$ values of 1.5, 1.5, 2.3, and 1.5 mm, so that their $D_1/D_{EP}$ ratios are 6.3, 6.4, 5.2, and 3.7, respectively. Preferably, the $D_1/D_{EP}$ ratio is greater than 3.0.

The second lens element has a positive optical power, i.e., $f_2>0$, and preferably has the following properties:

$f_2/f_0<2.0$;

$d_{12}/f_0>0.25$;

$D_2/D_{EP}>1.3$; and $t_2/f_0>0.5$;

where $f_2$ is the focal length of the second lens element, $d_{12}$ is the distance between the first and second lens elements, $D_2$ is the diameter of the second lens element, and $t_2$ is the thickness of the second lens element. Based on the above definition of the diameter of a lens element, the lens systems of Examples 1–4 set forth below have $D_2$ values of 4.0, 4.0, 4.5, and 3.9 mm, and $D_2/D_{EP}$ ratios of 2.7, 2.7, 2.0, and 2.6, respectively. Preferably, the $D_2/D_{EP}$ ratio is greater than 1.5.

In certain embodiments, the lens systems of the invention satisfy the following relationships:

$f_2/f_0<1.6$;

$d_{12}/f_0>0.5$; and $D_2/D_{EP}>1.5$.

In some embodiments, the second lens element is a refractive-diffractive hybrid element. The fabrication of such elements is well known in the art. See, for example, C. Londono, "Design and Fabrication of Surface Relief Diffractive Optical Elements, or Kinoforms, with Examples for Optical Athermalization," Ph.D. diss., Tufts University, 1992, and the references cited therein, the relevant portions of all of which are incorporated herein by reference. Diffractive surfaces have the problem of diffraction efficiency, i.e., all orders do not come to a perfect focus. This effect is often seen as "glare". For an electronic imaging system application, the diffraction efficiency problem can be addressed by digital processing of the electronic image.

When the second lens element is a refractive-diffractive hybrid, the ratio of $f_2/f_0$, where $f_2$ includes the contribution of the diffractive surface, is preferably greater than 1.0, e.g., the ratio is approximately 1.5. When a hybrid is not used, the $f_2/f_0$ ratio is preferably less than 1.0.

The use of a refractive-diffractive hybrid element for the second lens element provides color correction for the lens system and allows both the first and second lens elements to be composed of a low dispersion material such as acrylic. If such a hybrid element is not used, the first lens element should have a higher dispersion than the second lens element. For example, the first lens element can be composed of styrene and the second lens element can be composed of acrylic for such embodiments. Other plastics can, of course, be used if desired. For example, in place of styrene, polycarbonates and copolymers of polystyrene and acrylic (e.g., NAS) having flint-like dispersions can be used. See *The Handbook of Plastic Optics*, U.S. Precision Lens, Inc., Cincinnati, Ohio, 1983, pages 17–29. The highest levels of color correction (both axial and lateral) are generally achieved when the second lens element is a refractive-diffractive hybrid element.

In certain preferred embodiments, the first lens element has a spherical surface and a conic surface and the second lens element also has a spherical surface and a conic surface. This arrangement facilitates manufacture of the lens system.

In other embodiments, the second lens element can have two conic surfaces, and the first lens element can have an object side surface which is spherical and an image side surface which in some embodiments is a conic and in other embodiments is a general asphere. Specifically, the image side surface of the first lens element can be a conic when the second lens element is a refractive-diffractive hybrid element. Otherwise, for these embodiments, the image side surface of the first lens element is typically a general asphere to facilitate aberration correction. Conic surfaces are preferred to general aspherical surfaces since the polynomial used to define a general aspherical surface (see below) can lead to undesired surface configurations if the diameter is extended beyond the clear aperture, while a conic surface does not suffer from this problem.

The terms "spherical", "conic", and "general asphere" are used herein and in the claims in accordance with their conventional meanings in terms of a lens surface equation of the following type:

$$z = \frac{cy^2}{1+[1-(1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant Thus, a surface is spherical if "k" and "D" through "I" are all zero, a surface is a conic if "k" is non-zero and "D" through "I" are all zero, and a surface is a general asphere if at least one of "D" through "I" is non-zero. A surface for which "k" is non-zero and at least one of "D" through "I" is non-zero, is a general aspherical surface. Other equations besides that set forth above can of course be used to describe a surface of a lens element, and analogous considerations regarding the values of the parameters of such an equation will apply in determining whether a particular surface is a spherical surface, a conic surface, or a general aspherical surface.

Figure 2:
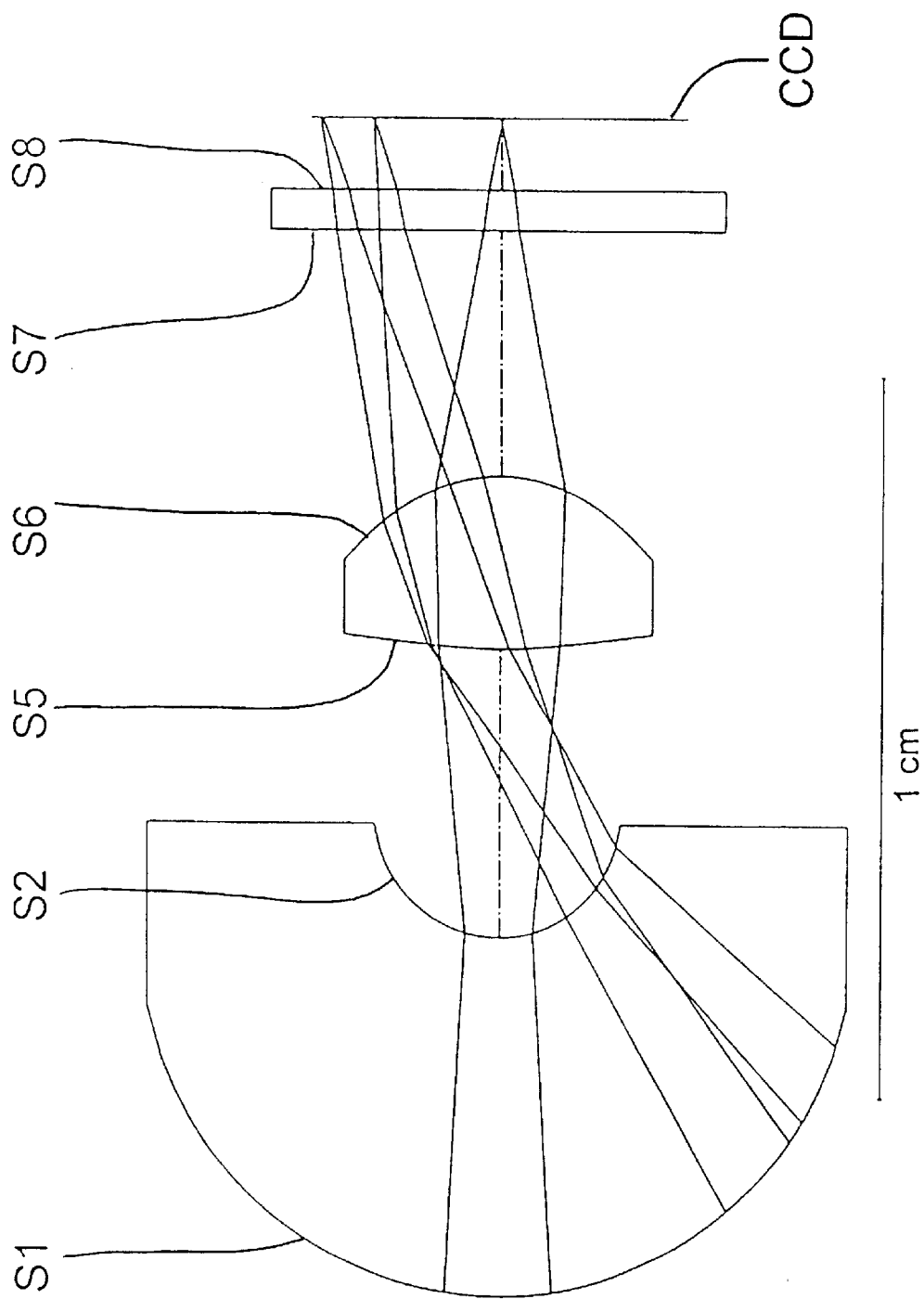
Figure 3:
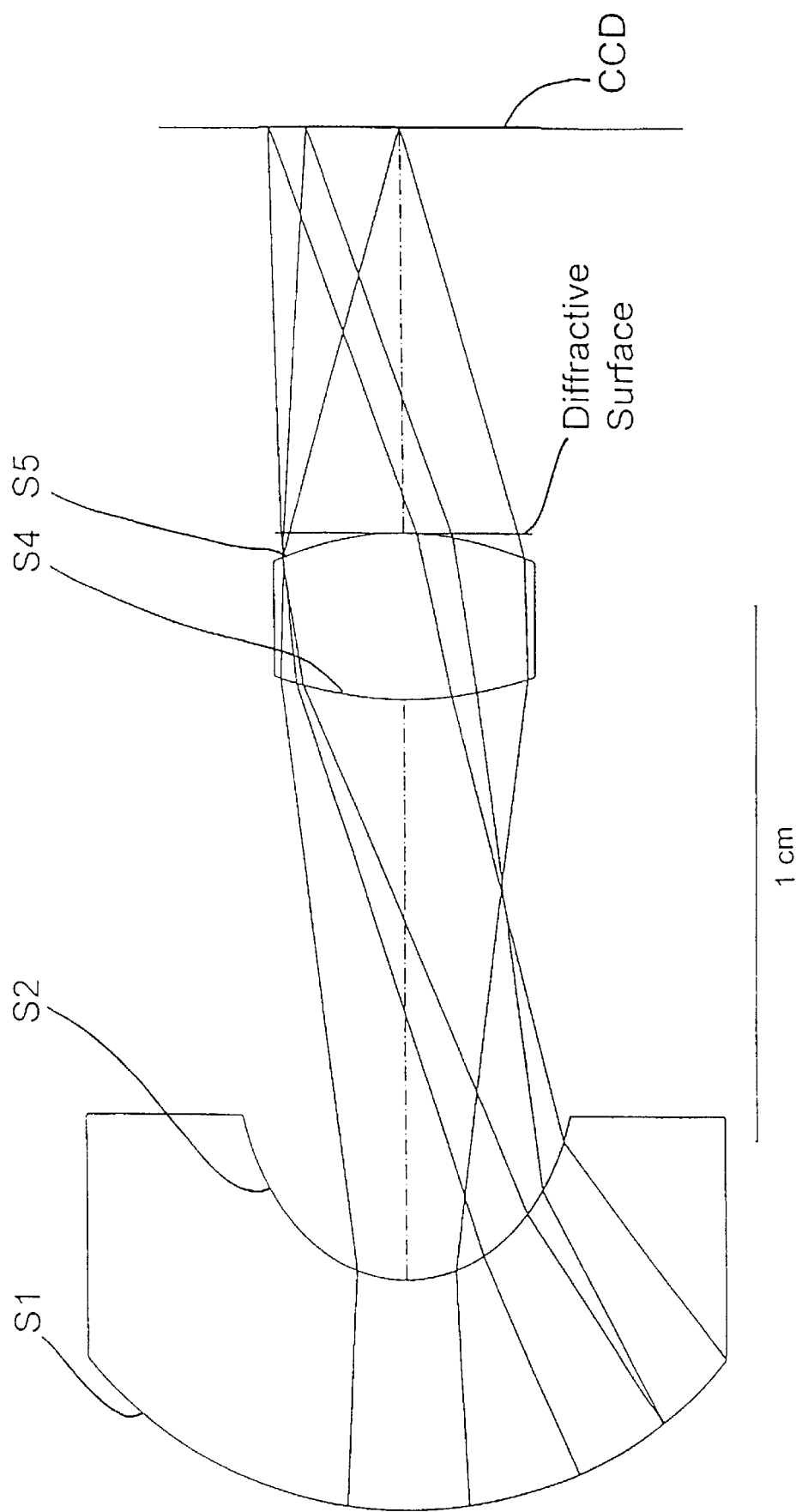
Figure 4:
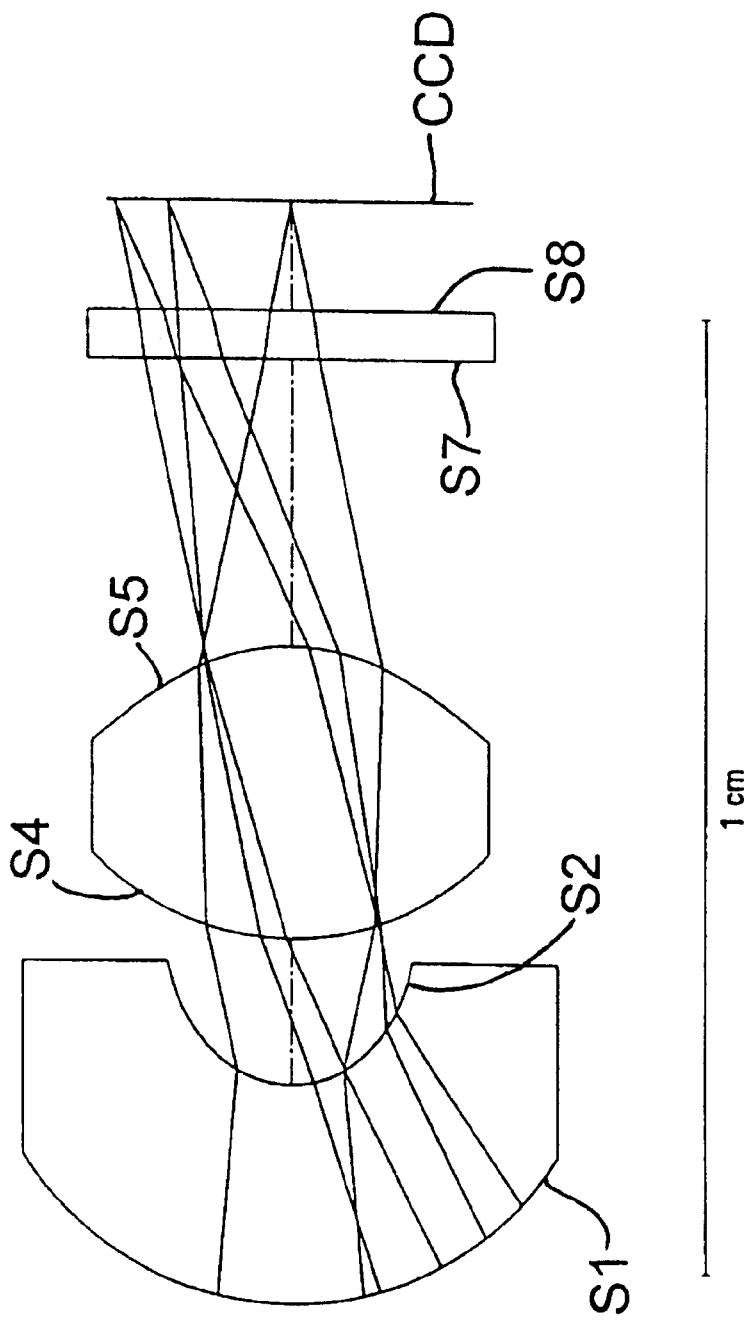

FIGS. 1 to 4 illustrate various lens systems constructed in accordance with the invention. Corresponding prescriptions and optical properties appear in Tables 1 to 4, respectively. The Hoya designation is used for the glass plate employed in FIGS. 2 and 4. Equivalent glasses made by other manufacturers can be used in the practice of the invention. Industry acceptable materials are used for the plastic elements.

The aspheric coefficients set forth in the Tables 1 and 2 are for use in the equation set forth above. The abbreviations used in the tables are as follows:

| | |
|---|---|
| EFL | effective focal length |
| FVD | front vertex distance |
| f/ | f-number |
| ENP | entrance pupil as seen from the long conjugate |
| BRL | barrel length |
| OBJ HT | object height |
| MAG | magnification |
| STOP | location and size of aperture stop |
| IMD | image distance |
| OBD | object distance |
| OVL | overall length. |

The designation "c" associated with various of the surfaces in the tables represents a conic surface. The designation "a" associated with surface 2 of Tables 1 and 2 represents a general aspherical surface. Surfaces 6 and 7 in Table 3 represent a diffractive surface. The asterisks used in this table represent the index of refraction and the Abbe numbers used in the Sweatt model for a diffractive surface, e.g., a Ne value of 9999 and a $V_e$ value of −3.4. See W. C. Sweatt, "Mathematical Equivalence between a Holographic Optical Element and an Ultra High Index Lens," *Journal of the Optical Society of America,* 69:486–487, 1979. Although shown as a separate element in FIG. 3, the diffractive surface is in fact part of the second lens element. Surface 3 in Tables 1–4 is a vignetting surface. All dimensions given in the tables are in millimeters.

As is conventional, the figures are drawn with the long conjugate on the left and the short conjugate on the right. Accordingly, in the typical application of the invention, the object to be viewed will be on the left and an electronic imaging system, e.g., a system employing a CCD, will be on the right.

Although specific embodiments of the invention have been described and illustrated, it is to be understood that a variety of modifications which do not depart from the scope and spirit of the invention will be evident to persons of ordinary skill in the art from the foregoing disclosure. The following claims are intended to cover the specific embodiments set forth herein as well as such modifications, variations, and equivalents.

TABLE 1

| Surf. No. | Type | Radius | Thickness | Glass | Clear Aperture Diameter |
|---|---|---|---|---|---|
| 1 |  | 4.9397 | 5.08731 | STYRENE | 9.54 |
| 2 | ac | 1.5323 | 2.89159 |  | 3.20 |
| 3 |  | ∞ | 0.92114 |  | 1.47 |
| 4 |  | Aperture stop | 0.18423 |  | 1.68 |
| 5 | c | 6.0166 | 2.21905 | ACRYLIC | 4.00 |
| 6 | c | −2.0489 | 4.67874 |  | 4.00 |

Symbol Description a — Polynomial asphere
c — Conic section

Conics

| Surface Number | Constant |
|---|---|
| 2 | −1.3889E−01 |
| 5 | −4.7668E+01 |
| 6 | −7.2577E−01 |

Even Polynomial Aspheres

| Surf. No. | D | E | F | G | H | I |
|---|---|---|---|---|---|---|
| 2 | 1.3599E−03 | 2.1563E−03 | −6.1775E−03 | 2.4938E−03 | 2.6865E−05 | −1.4075E−04 |

SYSTEM FIRST ORDER PROPERTIES

OBJ. HT: −310.00   f/   2.80   MAG:   −0.0080
STOP:   0.00 after surface   4.   DIA: 1.6001
EFL: 4.09873   FVD: 15.9821   ENP: 10.9749
IMD: 4.67874   BRL: 11.3033   EXP: −2.80210
OBD: −503.622   OVL: 519.604

First Order Properties of Elements

| Element Number | Surface Numbers | | Power | f |
|---|---|---|---|---|
| 1 | 1 | 2 | −0.11867 | −8.4271 |
| 2 | 5 | 6 | 0.29369 | 3.4050 |

TABLE 2

| Surf. No. | Type | Radius | Thickness | Glass | Clear Aperture Diameter |
|---|---|---|---|---|---|
| 1 |  | 4.8906 | 4.90000 | STYRENE | 9.60 |
| 2 | ac | 1.5840 | 2.88000 |  | 3.30 |
| 3 |  | ∞ | 0.95000 |  | 1.50 |
| 4 |  | Aperture stop | 0.19000 |  | 1.60 |
| 5 | c | 6.2277 | 2.40000 | ACRYLIC | 4.00 |
| 6 | c | −2.0793 | 3.37000 |  | 4.00 |

TABLE 2-continued

| | | | | |
|---|---|---|---|---|
| 7 | ∞ | 0.55000 | C5 | 6.00 |
| 8 | ∞ | 1.00005 | | 6.00 |

Symbol Description a — Polynomial asphere
c — Conic section

Conics

| Surface Number | Constant |
|---|---|
| 2 | −1.3889E−01 |
| 5 | −4.9915E+01 |
| 6 | −7.4312E−01 |

Even Polynomial Aspheres

| Surf. No. | D | E | F | G | H | I |
|---|---|---|---|---|---|---|
| 2 | −4.3543E−03 | 9.2650E−03 | −9.9861E−03 | 4.0803E−03 | −6.4199E−04 | 3.4693E−06 |

SYSTEM FIRST ORDER PROPERTIES

OBJ. HT: −308.00    f/  2.82   MAG:    −0.0080
STOP:      0.00 after surface    4. DIA: 1.5956
EFL: 4.16672    FVD: 16.2400    ENP: 10.6682
IMD: 1.00005    BRL: 15.2400    EXP: −6.87326
OBD: −512.386   OVL: 528.626

First Order Properties of Elements

| Element Number | Surface Numbers | | Power | f' |
|---|---|---|---|---|
| 1 | 1 | 2 | −0.11358 | −8.8047 |
| 2 | 5 | 6 | 0.28651 | 3.4903 |

TABLE 3

| Surf. No. | Type | Radius | Thickness | Glass | Clear Aperture Diameter |
|---|---|---|---|---|---|
| 1 | | 7.5616 | 4.34575 | ACRYLIC | 11.90 |
| 2 | c | 2.4466 | 7.85084 | | 5.83 |
| 3 | | ∞ | 2.90000 | | 3.75 |
| 4 | c | 6.4812 | 3.08783 | ACRYLIC | 4.57 |
| 5 | c | −5.1558 | 0.00100 | | 4.54 |
| 6 | | −1000.0000 | 0.00100 | ****** | 4.53 |
| 7 | | −998.8000 | 7.57866 | | 4.53 |

Symbol Description c — Conic section

Conics

| Surface Number | Constant |
|---|---|
| 2 | −3.9940E−01 |
| 4 | −2.4310E+00 |
| 5 | −2.2088E+00 |

SYSTEM FIRST ORDER PROPERTIES

OBJ. HT: −275.00    f/  1.84   MAG:    −0.0090
STOP:      2.53 after surface    4. DIA: 4.4613
EFL: 4.25080    FVD: 25.7651    ENP: 11.2131
IMD: 7.57866    BRL: 18.1864    EXP: −.388641
OBD: −463.377   OVL: 489.142

TABLE 3-continued

First Order Properties of Elements

| Element Number | Surface Numbers | | Power | f' |
|---|---|---|---|---|
| 1 | 1 | 2 | −0.98183E−01 | −10.185 |
| 2 | 4 | 5 | 0.15688 | 6.3745 |
| 3 | 6 | 7 | 0.12022E−01 | 83.183 |

TABLE 4

| Surf. No. | Type | Radius | Thickness | Glass | Clear Aperture Diameter |
|---|---|---|---|---|---|
| 1 | | 3.2860 | 2.29000 | STYRENE | 5.60 |
| 2 | c | 1.0740 | 1.51000 | | 2.30 |
| 3 | | ∞ | 0.00000 | | 1.90 |
| 4 | | 2.8130 | 3.10000 | ACRYLIC | 3.90 |
| 5 | c | −1.9130 | 0.00000 | | 3.90 |
| 6 | | Aperture stop | 3.00000 | | 1.90 |
| 7 | | ∞ | 0.50000 | C5 | 4.00 |
| 8 | | ∞ | 1.11707 | | 4.00 |

Symbol Description c — Conic section

TABLE 4-continued

Conics

| Surface Number | Constant |
|---|---|
| 2 | −3.1855E−01 |
| 5 | −1.4577E+00 |

SYSTEM FIRST ORDER PROPERTIES

OBJ. HT: −225.00  f/  2.50  MAG:  −0.0080
STOP:  0.00 after surface  6. DIA: 1.811
EFL: 3.81046  FVD: 11.5171  ENP: 5.46002
IMD: 1.11707  BRL: 10.4000  EXP: −3.32796
OBD: −474.118  OVL: 485.635

First Order Properties of Elements

| Element Number | Surface Numbers | Power | f' |
|---|---|---|---|
| 1 | 1   2 | −0.22890 | −4.3688 |
| 2 | 4   5 | 0.33962 | 2.9444 |

What is claimed is:

1. A lens system for forming an image of an object, said system having a focal length $f_0$ and consisting in order from its object side to its image side of:

(a) a first lens element having a focal length $f_1$ and a thickness $t_1$; and (b) a second lens element having a focal length $f_2$, said second lens element being spaced from the first lens element by a distance $d_{12}$;

wherein:

$f_1 < 0$;

$|f_1|/f_0 > 1.0$;

$t_1/f_0 > 0.5$;

$f_2 > 0$; and $d_{12}/f_0 > 0.25$.

2. The lens system of claim 1 wherein:

$|f_1|/f_0 > 1.5$;

$t_1/f_0 > 0.7$; and $d_{12}/f_0 > 0.5$.

3. The lens system of claim 1 or 2 wherein:

$f_2/f_0 < 2.0$.

4. The lens system of claim 3 wherein:

$f_2/f_0 < 1.6$.

5. The lens system of claim 1 or 2 wherein the second lens element has a thickness $t_2$ and wherein:

$t_2/f_0 > 0.5$.

6. The lens system of claim 1 or 2 wherein the first lens element has a higher dispersion than the second lens element.

7. The lens system of claim 6 wherein the first lens element is composed of styrene and the second lens element is composed of acrylic.

8. The lens system of claim 1 or 2 wherein the second lens element is a refractive-diffractive hybrid element.

9. The lens system of claim 8 wherein the first and second lens elements are composed of acrylic.

10. The lens system of claim 8 wherein:

$f_2/f_0 > 1.0$.

11. The lens system of claim 1 wherein:

(i) the first lens element has a spherical surface and a general aspherical surface; and (ii) the second lens element has two conic surfaces.

12. The lens system of claim 1 wherein:

(i) the first lens element has a spherical surface and a conic surface; and (ii) the second lens element has two conic surfaces.

13. The lens system of claim 12 wherein the second lens element is a refractive-diffractive hybrid element.

14. The lens system of claim 1 wherein:

(i) the first lens element has a spherical surface and a conic surface; and (ii) the second lens element has a spherical surface and a conic surface.

15. The lens system of claim 14 wherein the conic surface is on the object side of each of the first and second lens elements.

16. The lens system of claim 1 or 2 wherein the lens system has an entrance pupil whose diameter is $D_{EP}$, the first lens element has a diameter $D_1$, and the second lens element has a diameter $D_2$, where:

$D_1/D_{EP} > 2.5$; and $D_2/D_{EP} > 1.3$.

17. The lens system of claim 16 wherein:

$D_1/D_{EP} > 3.0$; and $D_2/D_{EP} > 1.5$.

18. A lens system for forming an image of an object, said system consisting in order from its object side to its image side of:

(a) a negative first lens element having a spherical surface and a general aspherical surface; and (b) a positive second lens element having two conic surfaces.

19. A lens system for forming an image of an object, said system consisting in order from its object side to its image side of:

(a) a negative first lens element having a spherical surface and a conic surface; and (b) a positive second lens element having two conic surfaces.

20. The lens system of claim 19 wherein the second lens element is a refractive-diffractive hybrid element.

21. A lens system for forming an image of an object, said system consisting in order from its object side to its image side of:

(a) a negative first lens element having a spherical surface and a conic surface; and (b) a positive second lens element having a spherical surface and a conic surface.

22. A lens system for forming an image of an object, said system having an entrance pupil whose diameter is $D_{EP}$ and consisting in order from its object side to its image side of:

(a) a negative lens element having a diameter $D_1$; and (b) a positive lens element having a diameter $D_2$;

wherein:

$$D_1/D_{EP} > 2.5; \text{ and}$$

$$D_2/D_{EP} > 1.3.$$

23. The lens system of claim 22 where:

$$D_1/D_{EP} > 3.0; \text{ and}$$

$$D_2/D_{EP} > 1.5.$$

24. An optical system comprising a lens system for forming an image of an object and an electronic imaging system for detecting said image, said lens system being the lens system of claim 1 or 2.

25. The optical system of claim 24 wherein the electronic imaging system is a charged coupled device.

26. An optical system comprising a lens system for forming an image of an object and an electronic imaging system for detecting said image, said lens system being the lens system of claim 18.

27. The optical system of claim 26 wherein the electronic imaging system is a charged coupled device.

28. An optical system comprising a lens system for forming an image of an object and an electronic imaging system for detecting said image, said lens system being the lens system of claim 19.

29. The optical system of claim 28 wherein the electronic imaging system is a charged coupled device.

30. An optical system comprising a lens system for forming an image of an object and an electronic imaging system for detecting said image, said lens system being the lens system of claim 21.

31. The optical system of claim 30 wherein the electronic imaging system is a charged coupled device.

32. An optical system comprising a lens system for forming an image of an object and an electronic imaging system for detecting said image, said lens system being the lens system of claim 22 or 23.

33. The optical system of claim 32 wherein the electronic imaging system is a charged coupled device.

* * * * *